(12) United States Patent
Lee

(10) Patent No.: US 11,919,075 B2
(45) Date of Patent: Mar. 5, 2024

(54) METHOD FOR MANUFACTURING OXIDE DISPERSION STRENGTHENED ALLOY USING ORGANIC/INORGANIC MIXED COMPOSITION AS RAW MATERIAL

(71) Applicant: Sangkyu Lee, Suwon-si (KR)

(72) Inventor: Sangkyu Lee, Suwon-si (KR)

(73) Assignee: Sangkyu Lee, Suwon-si (KR)

( * ) Notice: Subject to any disclaimer, the term of this patent is extended or adjusted under 35 U.S.C. 154(b) by 7 days.

(21) Appl. No.: 17/267,497

(22) PCT Filed: Aug. 12, 2019

(86) PCT No.: PCT/KR2019/010237
§ 371 (c)(1),
(2) Date: Feb. 10, 2021

(87) PCT Pub. No.: WO2020/032777
PCT Pub. Date: Feb. 13, 2020

(65) Prior Publication Data
US 2021/0260655 A1      Aug. 26, 2021

(30) Foreign Application Priority Data

Aug. 10, 2018   (KR) .................. 10-2018-0093892
Aug. 8, 2019    (KR) .................. 10-2019-0096924

(51) Int. Cl.
*B22F 10/18*    (2021.01)
*B22F 12/53*    (2021.01)
(Continued)

(52) U.S. Cl.
CPC ............... *B22F 10/18* (2021.01); *B22F 1/10* (2022.01); *B22F 1/103* (2022.01); *B22F 1/105* (2022.01);
(Continued)

(58) Field of Classification Search
CPC ........ B22F 3/1021; B22F 12/53; B22F 10/64; B22F 10/28; B22F 1/10; B22F 3/15; B22F 9/04; B22F 1/103; B22F 2302/253
See application file for complete search history.

(56) References Cited

U.S. PATENT DOCUMENTS

2010/0276104 A1* 11/2010 McCullough ........... B29C 45/50
                                                              164/113
2011/0256015 A1* 10/2011 ?slund ....................... B22F 3/15
                                                              75/228
(Continued)

FOREIGN PATENT DOCUMENTS

KR      10-1454797 B1      5/2014
KR      101454797 B1  *  10/2014
(Continued)

OTHER PUBLICATIONS

WO-2017057838-A1 english translation (Year: 2017).*
International Search Report for PCT/KR2019/017149 dated Nov. 18, 2019 (p. 2).

*Primary Examiner* — Ricardo D Morales
(74) *Attorney, Agent, or Firm* — Quantum Patent Law Firm; Seongyoune Kang

(57) ABSTRACT

According to an aspect of the present invention, a method for producing an oxide-dispersed strengthened alloy using organic-inorganic kneaded composition is provided. The method, comprises: a feedstock preparing step of preparing the organic-inorganic kneaded composition prepared by kneading, pulverizing and granulating ODS mixed powders and a polymer binder; a molding step of forming a semi-finished product having a predetermined shape using the organic-inorganic kneaded composition; a debinding step of removing the polymeric binder from the semi-finished product molded in the molding step; and a sintering step of extracting a final product having a predetermined shape by (Continued)

sintering and cooling the semi-finished product in which the polymeric binder has been removed in the debinding step.

19 Claims, 10 Drawing Sheets

(51) Int. Cl.
  *B22F 10/64*  (2021.01)
  *B22F 10/28*  (2021.01)
  *B22F 3/10*  (2006.01)
  *B22F 3/15*  (2006.01)
  *B22F 9/04*  (2006.01)
  *B22F 1/10*  (2022.01)
  *B22F 1/103*  (2022.01)
  *B22F 1/105*  (2022.01)

(52) U.S. Cl.
  CPC .............. *B22F 3/1021* (2013.01); *B22F 3/15* (2013.01); *B22F 9/04* (2013.01); *B22F 10/28* (2021.01); *B22F 10/64* (2021.01); *B22F 12/53* (2021.01); *B22F 2302/253* (2013.01)

(56) References Cited

U.S. PATENT DOCUMENTS

| | | |
|---|---|---|
| 2015/0093279 A1 | 4/2015 | Kington et al. |
| 2018/0250738 A1* | 9/2018 | Nakamura ............. B22F 1/102 |

FOREIGN PATENT DOCUMENTS

| | | | |
|---|---|---|---|
| KR | 10-2017-0040059 A | | 4/2017 |
| KR | 20170040059 A | * | 4/2017 |
| WO | WO-2017057838 A1 | * | 4/2017 ............ B22F 1/0062 |

\* cited by examiner

METHOD FOR MANUFACTURING OXIDE DISPERSION STRENGTHENED ALLOY USING ORGANIC/INORGANIC MIXED COMPOSITION AS RAW MATERIAL

CROSS-REFERENCE TO RELATED APPLICATIONS

This patent application is the U.S. national stage application of International Application No. PCT/KR2019/010237, filed Aug. 12, 2019 and the entire contents of which are incorporated herein by reference, which claims priority to Korean Application No. 10-2018-0093892, filed Aug. 10, 2018, and Korean Application No. 10-2019-0096924, filed Aug. 8, 2019, and the entire contents of which are incorporated herein by reference.

TECHNICAL FIELD

The present invention relates to a method for producing an oxide-dispersed strengthened alloy, specifically, a method for producing organic/inorganic raw kneading materials including mixed powders to produce an oxide-dispersed strengthened alloys (hereinafter, 'ODS mixed powders') and for producing an oxide-dispersed strengthened alloys with the raw kneading materials using 3-dimensional printing or metal injection molding.

BACKGROUND ART

With the development of the industry, research on alloy reinforcement methods that combines different materials for developing of high-temperature and high-strength materials are continuing. The alloy reinforcement methods include solid solution strengthening, precipitation strengthening, strain hardening, and oxide-dispersion strengthening. Solid solution strengthening is achieved by appropriately selecting and dissolving the alloy composition during the production of the alloy. In addition, the precipitation strengthening is to transform the material into a high-strength phase through thermal treatment or to precipitate a specific precipitate, and the strain hardening is also called work hardening, and makes the deformation of the material difficult as the dislocation density increases inside the material due to the deformation.

The oxide-dispersion strengthening (ODS) method is known to be a useful method at high temperatures. Oxide-dispersed strengthened alloys (ODS alloys) are alloys obtained by finely dispersing oxide particles which are stable at high temperatures and attracting attention in the field of superheat-resistant alloy development because of relatively little decrease in strength due to temperature rise.

Representative examples of ODS alloys include SAP (Sintered Aluminum Powder) or TD-nichrome (Thoria Dispersed Nichrome), and alumina ($Al_2O_3$), thoria ($THO_2$), and yttrium oxide ($Y_2O_3$) are used as dispersed particles, respectively.

Conventionally, to produce an ODS alloy, metal powder and metal oxide powder are mixed with each other and then pulverized in a ball mill or an attrition mill, and the metal and the metal oxide are mechanically alloyed to form an alloyed powder.

It has been common to manufacture ODS alloy products by subjecting the alloyed powders to complex processes such as degassing, hot sintering, hot forming, hot and cold forming, and heat treatment. Accordingly, a considerable amount of time is required for the manufacturing process when the ODS alloy products are manufactured by such conventional methods.

For example, it will take about 20-48 hours at a rotation speed of 200 rpm to 400 rpm for performing mechanical alloying of iron (Fe) and yttria ($Y_2O_3$) in an attrition mill. In addition, the process technology used to disperse metal oxide particles having a size of several nanometers to tens of nanometers into a metal with a high number density can be a factor that increases the manufacturing cost. Further, there are problems that it is not easy to optimize the conditions for mechanical alloying according to each metal material and it is not suitable for mass production because there is a limitation in capacity that can be processed once due to the characteristics of each mechanical alloying equipment.

Another problem in the manufacture of ODS alloy products is that ingots manufactured by hot forming or sintering at high temperatures using mechanically alloyed powders have extremely high strength and are disadvantageous in terms of machinability and formability. Specifically, products having complex internal shapes are exceedingly difficult to be manufactured by cutting and are not easy to be manufactured by welding.

DISCLOSURE OF INVENTION

Technical Problem

Therefore, the present invention has been made in view of the above problems, and it is an object of present invention to provide a method for manufacturing an ODS alloy having a shape of a final product by using 3D printing without performing mechanical alloying unlike a conventional manufacturing method. However, these problems are exemplary, and the scope of the present invention is not limited thereby.

SUMMARY

According to one aspect of the present invention for solving the above problems, a method for producing an oxide-dispersed strengthened alloy may comprise: a feedstock preparing step of preparing organic-inorganic kneaded composition prepared by kneading, pulverizing and granulating ODS mixed powders and a polymer binder; a molding step of forming a semi-finished product having a predetermined shape using the organic-inorganic kneaded composition; a debinding step of removing the polymeric binder from the semi-finished product molded in the molding step; and a sintering step of extracting a final product having a predetermined shape by sintering and cooling the semi-finished product in which the polymeric binder has been removed in the debinding step.

According to an embodiment of the present invention, the sintering step may include: a general sintering step of performing sintering at a sintering temperature after raising the sintering temperature to a temperature range of 1250° C. to 1325° C. or less in a vacuum atmosphere; and a hot isostatic pressure sintering step of performing sintering in a sintering temperature lower than the sintering temperature of the general sintering step in an isostatic pressure atmosphere.

According to an embodiment of the present invention, the sintering temperature of the hot isostatic pressure sintering step may have a temperature range of 1100° C. to 1200° C.

According to an embodiment of the present invention, the molding step is performed using a 3D printer, and includes:

a feedstock supply step of supplying the organic-inorganic kneaded composition to an extrusion head of the 3D printer; a lamination step of laminating a printed layer on a plate by discharging the molten organic-inorganic kneaded composition to the surface of the plate through a nozzle of the extrusion head; and a semi-finished product forming step of forming a semi-finished product by continuously laminating the printed layer in a three-dimensional shape of an object to be printed by repeatedly performing the lamination step.

According to an embodiment of the present invention, the molding step is performed using a metal injection molding unit and includes: a feedstock supply step of supplying the organic-inorganic kneaded composition to the metal injection molding unit; and a semi-finished product molding step of injection-forming the semi-finished product using the metal injection molding unit.

According to an embodiment of the present invention, the hot isostatic pressure sintering step may be performed for 1 to 5 hours in an argon (Ar) atmosphere of 1000 to 1200 bar.

According to an embodiment of the present invention, the method may further include, prior to the sintering step, a pre-sintering step of heating the semi-finished product from which the polymeric binder has been removed in the debinding step and the semi-finished product is heated in a vacuum atmosphere in a range of 700° C. to 900° C. in the pre-sintering step.

According to an embodiment of the present invention, the ODS mixed powders may be a mixture of metal powders and metal oxides.

According to an embodiment of the present invention, the metal powders may include at least one of nickel, iron, chromium, manganese, molybdenum, aluminum, titanium, and zirconium.

According to an embodiment of the present invention, the metal oxides may include one or more of yttria ($Y_2O_3$), thorium oxide ($ThO_2$), lanthanum oxide ($La_2O_3$), alumina ($Al_2O_3$), and scandium oxide ($Sc_2O_3$).

According to an embodiment of the present invention, in the feedstock preparing step, the organic-inorganic kneaded composition may be prepared by kneading, pulverizing and granulating 90.0 to 94.0 wt % of the ODS mixed powders, 3.0 to 5.0 wt % of the binder, 2.5 to 3.5 wt % of the plasticizer, and 0.5 to 1.5 wt % of the lubricant.

According to an embodiment of the present invention, the binder may include a polyethylene copolymer.

According to an embodiment of the present invention, the plasticizer may include paraffin wax.

According to an embodiment of the present invention, the lubricant may include stearic acid.

According to an embodiment of the present invention, the debinding step may include: a solvent debinding step of removing the plasticizer and lubricant from the polymeric binder by immersing the semi-finished product in a solvent; and a hot debinding step of removing the binder from the polymeric binder by heating the semi-finished product in the solvent debinding step.

According to an embodiment of the present invention, the solvent debinding step may include immersing the semi-finished product in a tetrahydrofuran or heptane solvent at 25 to 35° C. for 24 hours or more to remove the plasticizer and the lubricant.

According to an embodiment of the present invention, the hot debinding step may include removing the binder by heating the semi-finished product while raising a temperature in a range of 450° C. to 500° C. in a nitrogen ($N_2$) atmosphere.

Effect of the Invention

According to an embodiment of the present invention as described above, an oxide-dispersed strengthened alloys that requires excellent mechanical properties and high precision can be produced by a 3D printing or metal injection molding method using an organic-inorganic kneaded composition containing ODS mixed powders as a feedstock. In addition, while the manufacturing method is simpler than the conventional method, there is an advantageous effect in terms of economy in that it can significantly reduce a separate processing step for realizing the shape after molding. Meanwhile, the scope of the present invention is not limited by these effects.

DETAILED DESCRIPTION OF THE PREFERRED EMBODIMENTS

Figure 1:
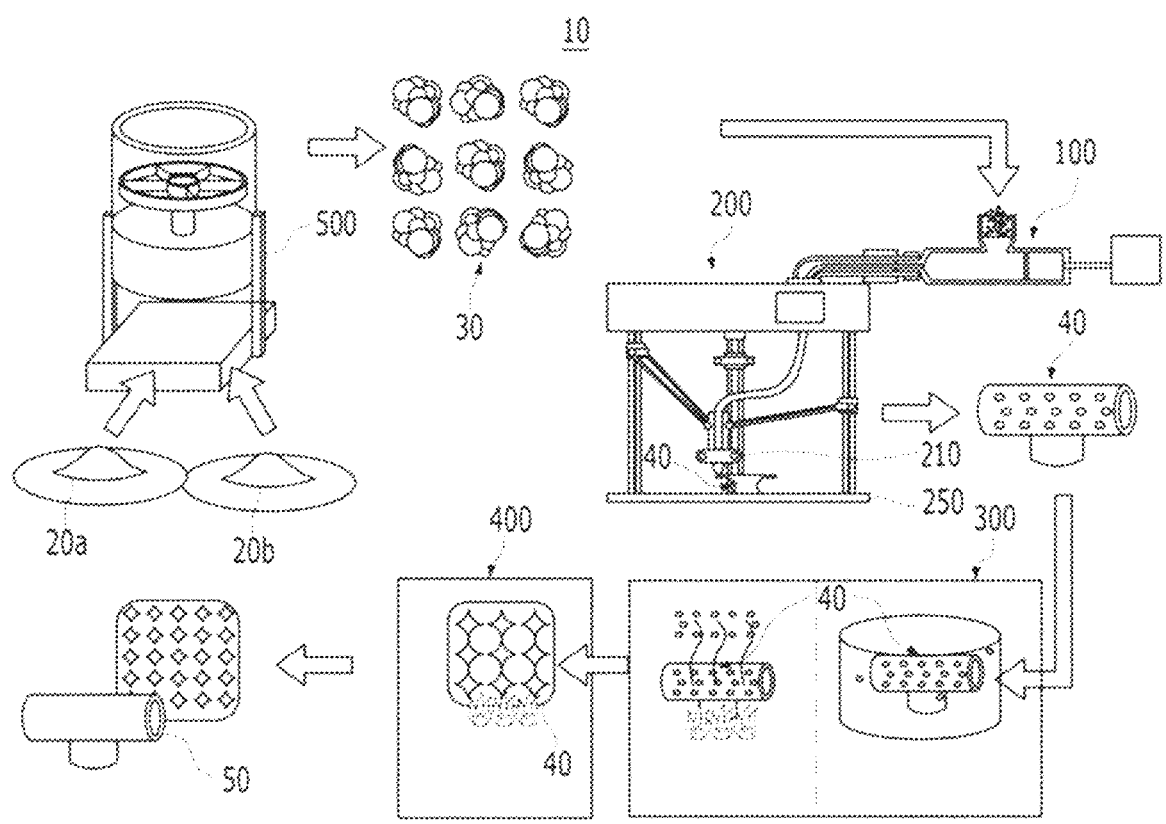
FIG. 1 is an illustration for explaining the concept of 3D printing using an organic-inorganic kneaded composition according to the present invention.

The following detailed description refers to the accompanying drawings, which illustrate specific embodiments in which the present invention may be practiced. These embodiments are described in detail sufficient to enable a person skilled in the art to practice the present invention. It is to be understood that the various embodiments of the present invention are different from each other but need not be mutually exclusive. For example, certain shapes, structures, and characteristics described herein may be implemented in other embodiments without departing from the spirit and scope of the present invention in relation to one embodiment. In addition, it is to be understood that the location or arrangement of individual components within each disclosed embodiment may be changed without departing from the spirit and scope of the present invention. Accordingly, the detailed description to be described below is not intended to be taken in a limiting sense, and the scope of the present invention, if appropriately described, is limited only by the appended claims, along with all scopes equivalent to those claimed by the claims. In the drawings, similar reference numerals refer to the same or similar functions over various aspects, and the length, area, thickness, and the like may be exaggerated and expressed for convenience.

Hereinafter, preferred embodiments of the present invention will be described in detail with reference to the accompanying drawings to enable those skilled in the art to easily implement the present invention.

FIG. 1 is an illustration for explaining a concept 10 for performing 3D printing using an organic-inorganic kneaded composition 30 and a 3D printing apparatus according to the present invention.

Referring to FIG. 1, the organic-inorganic kneaded composition 30 according to the present invention is produced by homogeneously kneading ODS mixed powders 20a and a polymeric binder 20b at a high temperature through a kneading machine 500 and by pulverizing and granulating into pellets having a certain particle size through a pulverizer or a pelletizer. using a tier and granulating into pellets having a certain particle size. The organic-inorganic kneaded composition 30 prepared in this way is supplied to the extrusion head 210 of a three-dimensional printing unit 200 and used as a feedstock to manufacture a product by being laminated through the three-dimensional printing unit 200 in a three-dimensional printing method. In this case, preferably, the organic-inorganic kneaded composition 30 is provided to the extrusion head 210 by being melted and pressurized through the feedstock supply unit 100 so that it can be smoothly supplied to the extrusion head 210 of the 3D printing unit 200.

The organic-inorganic kneaded composition 30 supplied to the extrusion head 210 is discharged to the surface of a base plate 250 in a manner like a hot melt adhesive gun, so that a semi-finished product 40 is molded by successively laminating printed layers in a three-dimensional shape of the object to be printed. The polymeric binder component is removed from the semi-finished product 40 molded in this way by a solvent and hot debinding method in the debinding unit 300. The semi-finished product 40 is sintered at a high temperature in the sintering unit 400 and cooled to room temperature to be extracted as a final product 50 of a high-density metal sintered body.

In order to mold a high-strength product by a three-dimensional printing method, the present invention proposes a composition in which ODS mixed powders are agglomerated with a polymeric binder as a feedstock for three-dimensional printing as described above.

ODS mixed powders are prepared by mixing metal powders and metal oxides.

The metal powders may be used by mixing one or more metal powders such as nickel, iron, chromium, manganese, molybdenum, aluminum, titanium, and zirconium, and the type of the metal powder is not limited thereto.

In addition, the metal oxide may be one selected from yttria ($Y_2O_3$), thorium oxide ($ThO_2$), lanthanum oxide ($La_2O_3$), alumina ($Al_2O_3$), and scandium oxide ($Sc_2O_3$).

More specifically, the ODS mixed powders may have a composition of 0.2 to 5.0 wt % of the metal oxide.

Metal powders and metal oxide powders may be mixed into the ODS mixed powders through a ball-mill or an attrition mill. The ODS mixed powders mixed by a ball-mill can be selected based on a particle size through a mesh. In this case, the size of the mesh is 325 or more, and particles filtered through the mesh can be used. The particle sizes (maximum diameter) of the ODS mixed powders are 10 μm to 45 μm.

After preparing the ODS mixed powders, it can be mixed with a binder to prepare a feedstock for 3D printing. More specifically, the ODS mixed powders are kneaded with a polymeric binder including a binder, a plasticizer, and a lubricant. The composition prepared by kneading the ODS mixed powders and a polymeric binder becomes a feedstock for 3D printing, hereinafter referred to as an organic-inorganic kneaded composition.

According to the technical idea of the present invention, compared to the prior art, the ODS mixed powders have undergone a very weak degree of mechanical alloying or substantially no mechanical alloying and may be only at a level in which metal powders of different materials and metal oxide powders are uniformly mixed. In other words, the process conditions applied in the step of mixing the metal powders and the metal oxide powders through a ball mill or an attraction mill are different from the existing process conditions for mechanical alloying and require a shorter process time and a smaller input energy. Accordingly, the ODS alloy powders prepared according to the embodiment of the present invention exhibits a microstructure different from that of the powders prepared by conventional mechanical alloying.

According to the technical idea of the present invention, an ODS alloy having excellent properties can be manufactured by performing 3D printing using an organic-inorganic kneaded composition obtained by kneading the ODS mixed powders prepared by the above-described method with a polymeric binder. In particular, as 3D printing is used, there is an excellent effect that products with complex internal shapes can be manufactured immediately without a separate processing process (cutting or molding).

With respect to the total weight of the organic-inorganic kneaded composition, the ODS mixed powders may be included in an amount of 90.0 to 94.0 wt %, and a polymeric binder may be included in an amount of 6.0 to 10.0 wt %. If the ODS organic-inorganic kneaded composition is less than 90.0 wt % of the total weight, a large amount of polymeric binder is removed by the debinding process described later, so that the shape of the semi-finished product 40 cannot be maintained in the three-dimensional shape of the object to be printed, and when the ODS organic-inorganic kneaded composition exceeds 94.0 wt %, it is difficult to secure cohesive strength as a feedstock for 3D printing because only a small amount of a polymeric binder is added.

The binder may include at least one copolymer selected from the group consisting of polystyrene, polyethylene, polypropylene, ethylene-vinylacetate, ethylene-ethylacrylate, methyl-methacrylate, and butyl-methacrylate as a backbone binder that is added to secure the cohesive force required in the 3D printing process due to the low bonding strength among the spherical powdered ODS mixed powders.

In particular, a polyethylene copolymer is preferable as a binder added to the ODS mixed powders. While the polyethylene copolymer is removed at high temperature, the steel product that has undergone a hot debinding process can maintain its shape. It is preferable that the polyethylene copolymer contains 3 to 5 wt % of the total weight of the organic-inorganic kneaded composition.

The plasticizer is an organic material that is added to the agglomerated composition by combining the ODS mixed powders and the binder to facilitate molding process during 3D printing, and microcrystalline wax, paraffin wax, montan wax and the like can be used as the plasticizer. Specifically, in an embodiment of the present invention, paraffin wax may be added as a plasticizer in order to increase ductility by lowering the bonding force among polymeric binders even at a relatively low temperature. The paraffin wax is preferably contained in an amount of 2.5 to 3.5% by weight of the total weight of the organic-inorganic kneaded composition.

The lubricant is a component to be added so that the organic-inorganic kneaded composition might be melted in the feedstock feeder and then smoothly supplied to the extrusion head 210 of the 3D printer 200 via a supply guide tube, which improves the surface slippage during pressure injection. The lubricant may include stearic acid, oleic acid, palmitic acid, linolenic acid, and the like. As an example, when stearic acid is added, the stearic acid is preferably contained in an amount of 0.5 to 1.5% by weight of the total weight of the organic-inorganic kneaded composition.

The ODS mixed powders and the polymeric binder may be uniformly kneaded for 1 hour at 170° C., which is a temperature at which the polyethylene copolymer that is a binder contained in the polymer binder is completely melted, and then cooled to room temperature. The mixture cooled after heating and kneading is pulverized in a pulverizer or pelletizer and granulated into pellets having a certain particle size, thereby finally producing an organic-inorganic kneaded composition.

Hereinafter, a method of manufacturing a product using the above-described organic-inorganic kneaded composition as a feedstock by a three-dimensional printing method will be described in detail.

Figure 2:
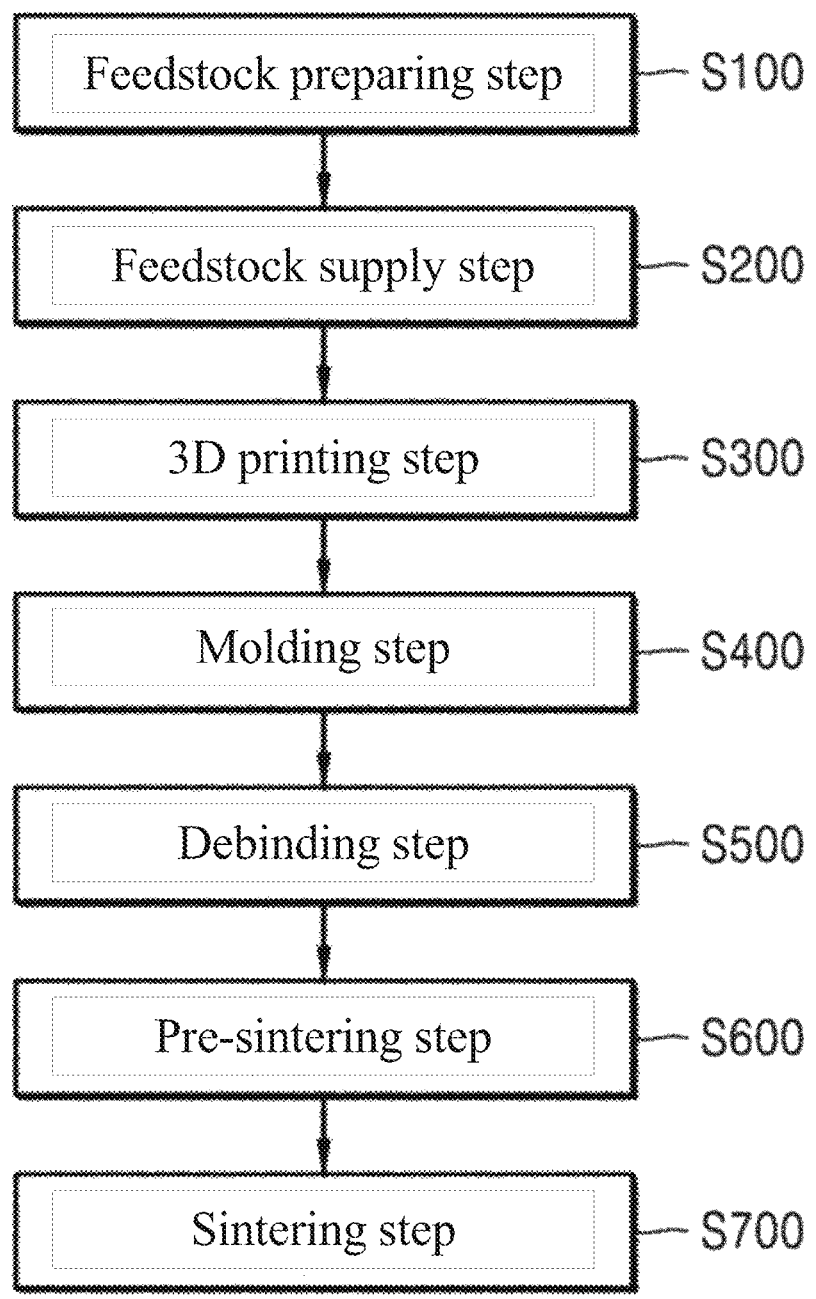
FIG. 2 is a flow chart for explaining a 3D printing method using the organic-inorganic kneaded composition as a feedstock according to the present invention.

FIG. 2 is a flow chart illustrating a 3D printing method using an organic-inorganic kneaded composition as a feedstock according to the present invention.

Referring to FIGS. 1 and 2, the three-dimensional printing method using the organic-inorganic kneaded composition as a feedstock according to the present invention, firstly includes preparing an organic-inorganic kneaded composition by kneading ODS mixed powders and a polymer binder, and then pulverizing and granulating them (feedstock preparing step; S100).

In the feedstock preparing step S100, the ODS mixed powders and the polymeric binder are homogeneously kneaded and then cooled to room temperature. At this time, the kneading process is performed for 1 hour at a high temperature of 170° C. or higher at which the polyethylene copolymer is completely melted so that the polyethylene copolymer, that is a binder contained in the polymeric binder, is melted, and homogeneously kneaded with the ODS mixed powders. After heating and kneading in this way, the cooled mixture is pulverized using a pulverizer or a pelletizer, and granulated into pellets having a certain particle size, so that the organic-inorganic kneaded composition is prepared as a feedstock in the 3D printing process described later.

Then, the organic-inorganic kneaded composition prepared in the feedstock preparing step S100 is supplied to the extrusion head 210 of the 3D printer 200 (feedstock supply step; S200). In the feedstock supply step S200, preferably, the organic-inorganic kneaded composition 30 is supplied to the extrusion head 210 with being melted and pressurized by the feedstock feeder 100 in order to be smoothly supplied to the extrusion head 210 of the 3D printer 200. However, in some cases, in the feedstock supply step S200, the organic-inorganic kneaded composition 30 is configured to be directly supplied to the extrusion head 210 of the 3D printer 200 without being melted and pressurized by the feedstock feeder 100 and melted with heat generated by the extrusion head 210 itself.

Then, the molten organic-inorganic kneaded composition supplied in the feedstock supply step S200 is discharged through a nozzle of the extrusion head 210 of the 3D printer 200 to a base plate 250 to laminate a printed layer on the base plate 250 (lamination step; S300). This lamination step S300 is repeatedly performed to mold a semi-finished product 40 by successively laminating printed layers to have a three-dimensional shape of the object to be printed (molding step; S400). In the laminating step S300 and the molding step S400, printing is performed in a continuous way that the extrusion head 210 of the 3D printer 200 moves in the X-axis and Y-axis with respect to the top surface of the base plate 250 to discharge the molten organic-inorganic kneaded composition to laminate one printed layer in the Z-axis, and then, repeats to move in the X-axis and Y-axis as above to laminate the next printed layers in the Z-axis. In this manner, a semi-finished product 40 having a three-dimensional shape of the object to be printed is molded.

Then, the semi-finished product 40 that has been molded by 3D printing in the molding step S400 may be transferred to the debinding unit 300 and the polymeric binder components contained in the semi-finished product 40 is removed by heating in the debinding unit 300 (debinding step; S500).

Figure 3:
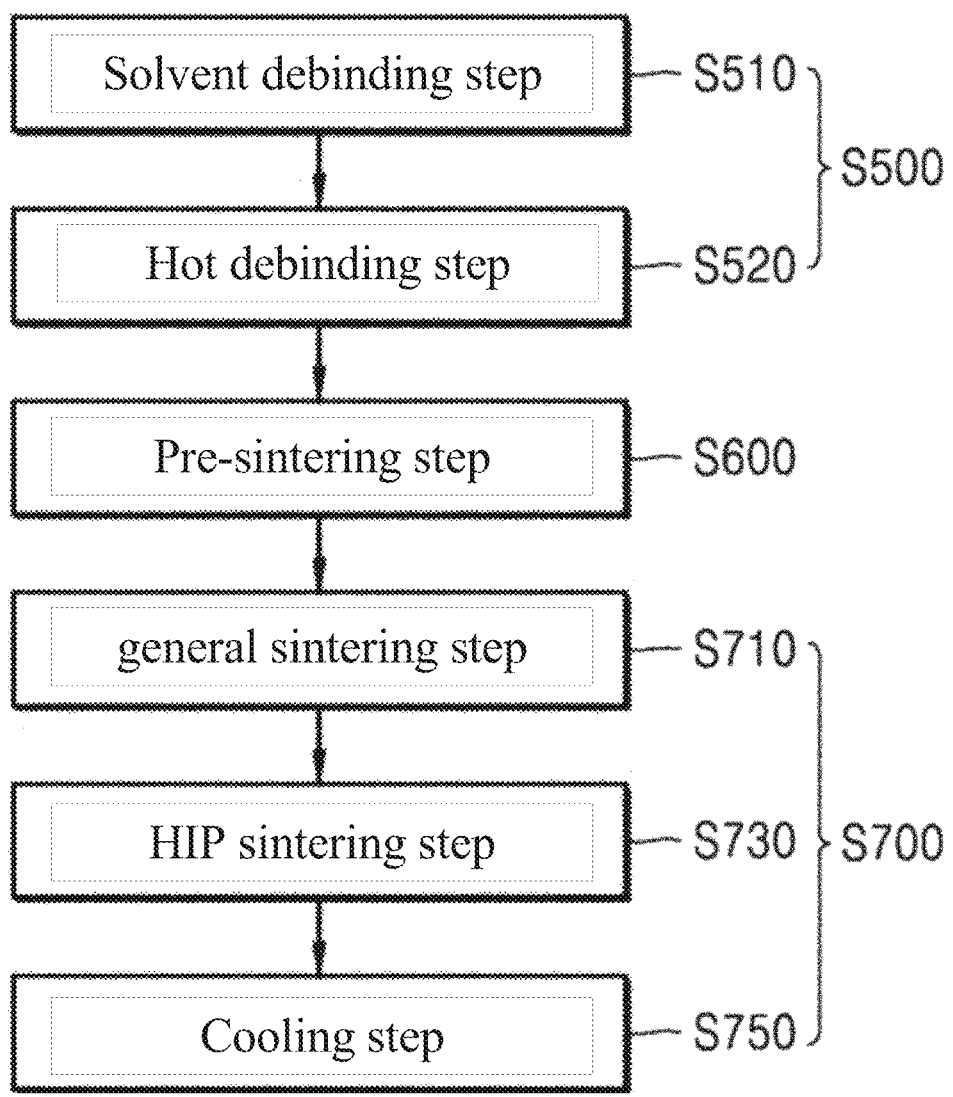
FIG. 3 is a flow chart for explaining in more detail the steps of debinding, pre-sintering, and sintering in the 3D printing method using the organic-inorganic kneaded composition as a feedstock according to the present invention shown in FIG. 2.

More specifically, as shown in FIG. 3, the debinding process is performed step by step in the debinding step S500 which includes: removing paraffin wax that is a plasticizer and stearic acid that is a lubricant contained in the polymeric binder by immersing the semi-finished product 40 molded by 3D printing in a solvent in a solvent debinding manner (solvent debinding step; S510); and removing the polyethylene copolymer which is a binder contained in the polymer binder by heating the semi-finished product 40, which has been subjected to solvent debinding step, in a hot debinding manner (hot debinding step; S520).

First, in the solvent debinding step S510 corresponding to a dewaxing process, the semi-finished product 40 molded by three-dimensional printing is immersed in a tetrahydrofuran or heptane solvent. Paraffin wax and stearic acid contained in the polymer binder are first removed by dissolving in the tetrahydrofuran or heptane solvent. At this time, the solvent debinding process is performed at the temperature 25 to 35° C. of the solvent for more than 24 hours. When the temperature of the solvent is less than 25° C., as the paraffin wax and stearic acid are rapidly removed from the semi-finished product 40, cracks are likely to occur in the semi-finished product 40. When the temperature of the solvent exceeds 35° C., the rate at which paraffin wax and stearic acid are removed from the semi-finished product 40 for a certain period of time (removal rate) becomes low, and as the paraffin wax and stearic acid remained during the hot debinding process described later are rapidly removed, cracks are likely to occur in the semi-finished product 40, and there occurs a problem that it takes a long time for the solvent debinding process to achieve a target removal rate. In addition, if the semi-finished product 40 is immersed in the solvent at the temperature of 25 to 35° C. for less than 24 hours, the rate at which the paraffin wax and stearic acid are removed (removal rate) decreases, and the paraffin wax and stearic acid remaining during the hot debinding process are rapidly removed. Accordingly, a crack may occur in the semi-finished product 40.

After the solvent debinding step S510 is completed, the polyethylene copolymer which is the binder component of the polymeric binder and is not dissolved in a tetrahydrofuran or heptane solvent is removed by the hot debinding step S520 of heating the semi-finished product 40. In the hot debinding step S520, the residual amount of paraffin wax and stearic acid that are not removed in the solvent debinding step S510 and remain in the semi-finished product 40 are also removed. In the heating process in the hot debinding step S520 for removing the polymeric binder from the semi-finished product 40, the rate of increasing temperature is important.

Figure 4:
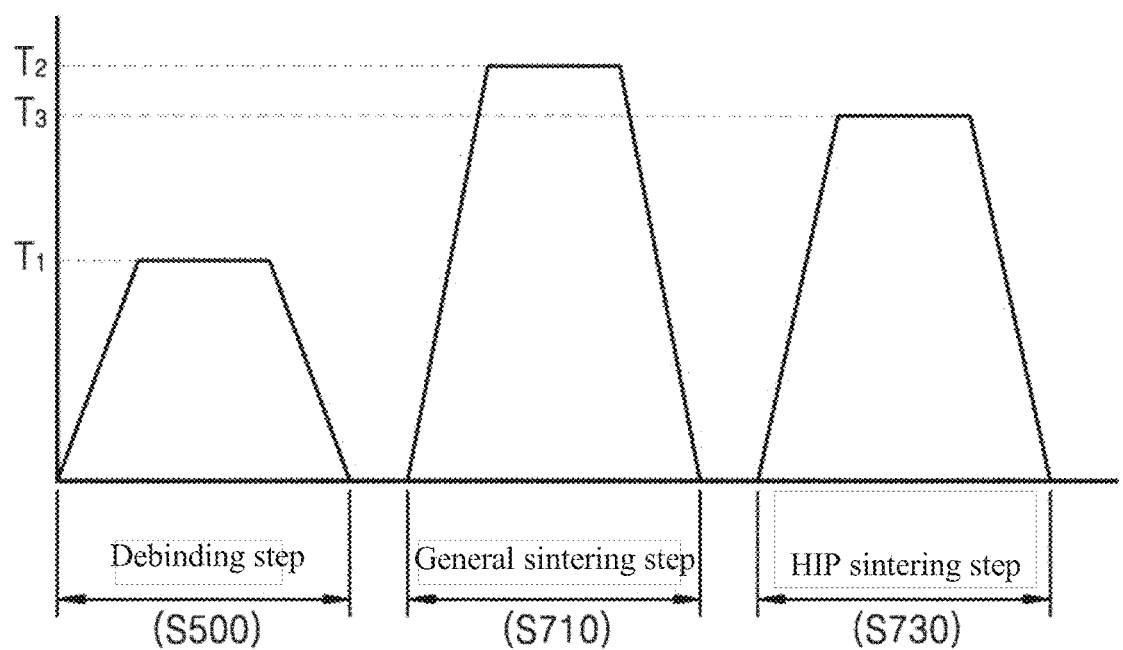
FIG. 4 is a graph showing time versus temperature change in a debinding, sintering, and cooling section of a 3D printing method using an organic-inorganic kneaded composition according to the present invention as a feedstock.

Therefore, as shown in the debinding section of the time vs. temperature graph shown in FIG. 4, a temperature increases stepwise to T1. And the temperature increasing rate is kept low for the temperature section in which each of the paraffin wax, stearic acid, and polyethylene copolymer is removed and by setting the holding time of the temperature longer, the paraffin wax, stearic acid, and polyethylene copolymer can be more reliably removed from the semi-finished product 40. Here, T1 may have a range of 450° C. to 500° C. The total time required for the hot debinding step S520 is preferably 40 hours or more, and it is preferable to perform hot debinding in a nitrogen ($N_2$) atmosphere to prevent oxidation of the metal contained in the semi-finished product 40 as much as possible.

Prior to transferring the semi-finished product 40 that has undergone the debinding step S500 to the sintering furnace 400 to proceed with the sintering step S700 to be described later, a step of pre-sintering (pre-sintering step; S600) may be selectively performed. In the pre-sintering step S600, the semi-finished product 40 from which the polymeric binder has been removed is heated and preliminarily sintered while the temperature is raised stepwise in the range of 700° C. to 900° C. in a vacuum atmosphere. The reason why the pre-sintering step S600 was performed before the full-scale sintering is because the semi-finished product 40 immediately after the debinding step S500 is in an unstable state in which all polymeric binders have been removed, so it is difficult to handle the transfer to the sintering furnace 400. The semi-finished product 40 preliminarily pre-sintered in the pre-sintering step S600 has a fine volume shrinkage of about 0.5 to 1.0%, compared to the semi-finished product 40 immediately after the debinding step S500. If the debinding step S500 and the sintering step S600 are performed in one place without transferring the semi-finished product 40, the pre-sintering step S600 of preliminarily pre-sintering the semi-finished product 40 may be omitted.

The semi-finished product 40 from which the polymeric binder has been removed in the debinding step S500 is extracted into the final product 50 as a sintered body through a sintering process in the sintering furnace 400 (sintering step; S700). In the sintering process, any one of general sintering, pressure sintering, and hot isostatic pressure sintering, or a sintering method in which these are combined may be used.

Specifically, in the present invention, as shown in FIG. 3, the semi-finished product 40 is sintered by sequentially performing general sintering and hot isostatic pressure sintering. Here, general sintering refers to a conventional sintering step in which sintering is performed without applying a separate pressure during the sintering process. FIG. 4 is a graph showing the temperature over time of the general sintering step and the hot isostatic pressure sintering step. Hereinafter, the sintering step will be described with reference to FIG. 4.

First, the semi-finished product 40 that has undergone the debinding step S500 or the pre-sintering step S600 is heated to a sintering temperature of T2 in a sintering furnace having a vacuum atmosphere, and then sintering is performed (general sintering step; S710). The T2 may have a temperature range of more than 1250° C. and 1325° C. or less.

After the general sintering is completed, the specimen is taken out from the sintering furnace, the temperature is raised to a sintering temperature T3 in the isostatic pressure sintering unit, and hot isostatic pressure sintering is performed (hot isostatic pressure sintering step; S730). The T3 may have a temperature range of 1100° C. to 1200° C. Hot isostatic pressure sintering may be performed by holding for 1 to 5 hours in an argon (Ar) atmosphere under a pressure of 1000 to 1200 bar.

The hot isostatic pressure sintering step S730 is a process performed to improve the physical and mechanical properties of the semi-finished product 40 and a homogeneous and dense product 50 can be obtained by isotropically pressurized and heated by means of an inert gas such as argon (Ar) to prevent volatilization of the metal components contained in the semi-finished product 40. When the sintering temperature is less than 1100° C., it may be difficult to obtain a dense and high relative density sintered structure, and when the temperature exceeds 1200° C., the temperature is too high, resulting in coarsening of the structure and deterioration of mechanical properties.

In the general sintering step S710 or the hot isostatic pressure sintering step S730, the temperature may be increased step by step at an appropriate rate of temperature increase considering thermal shock due to a rapid temperature increase.

The semi-finished product 40, which has been sintered in the hot isostatic pressure sintering step S730, is cooled to room temperature and extracted as a final product 50 (cooling step; S750). In the cooling step S750, cooling is performed in an argon (Ar) atmosphere like the hot isostatic pressure sintering step S730 to prevent volatilization of the metal components contained in the semi-finished product 40.

The inventors of the present invention have found that it is possible to implement an ODS alloy having excellent mechanical properties only when the sintering temperature is set in a certain temperature range in the general sintering step S710 which is performed prior to the final hot isostatic pressure sintering in the step of sintering the debinded specimen. The temperature range in this general sintering step may have a range of more than 1250° C. and 1325° C. or less, preferably more than 1250° C. and 1300° C. or less, and more preferably from 1275° C. to 1300° C. The range of the sintering temperature in this general sintering step may have a higher value than the sintering temperature in the subsequent hot isostatic pressure step.

This temperature range can be interpreted as a temperature range for supplying thermal energy required to completely remove fine organic matter which has remained without being completely removed in the debinding step. This will be described in more detail in the first and second embodiments to be described later.

According to a modified embodiment of the present invention, the organic-inorganic kneaded composition may be made into an ODS alloy by metal injection molding (MIM). The metal injection molding technology combines sintering technology of metal powders with conventional plastic injection molding technology, and is a technology that performs injection molding using an organic-inorganic kneaded composition containing metal powders and an organic binder as a feedstock.

Figure 10:
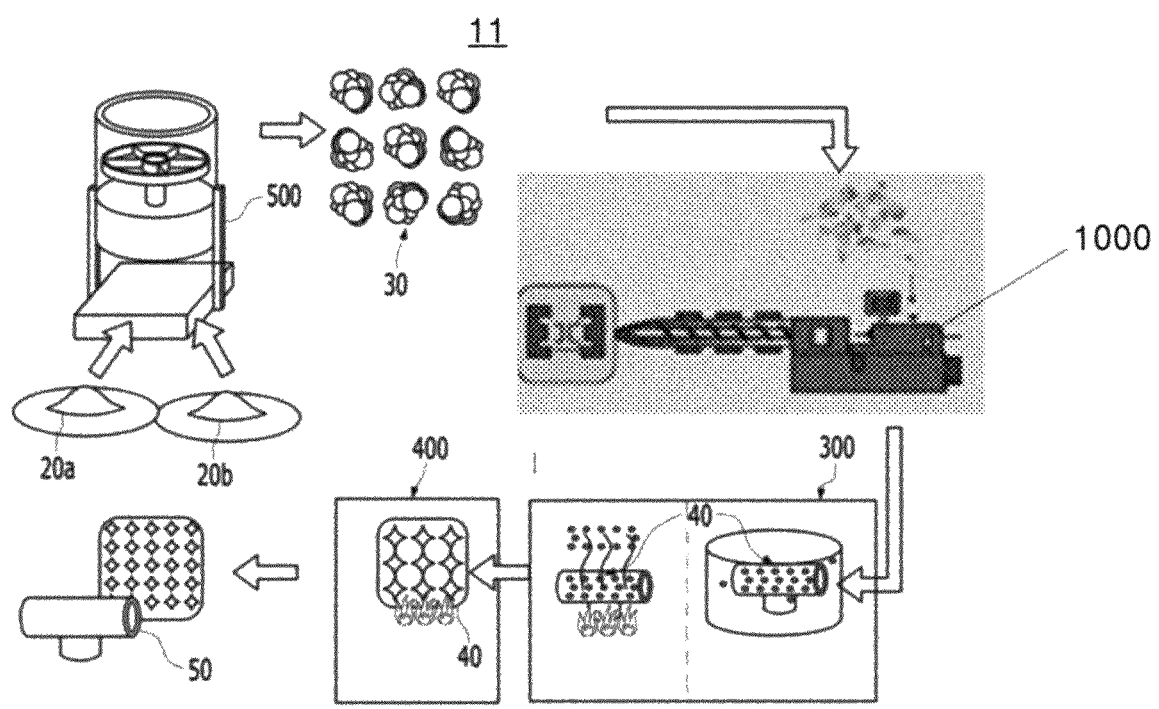
FIG. 10 is an illustration for explaining the concept of performing injection molding with a metal injection molding unit using the organic-inorganic kneaded composition according to the present invention.

FIG. 10 is a diagram illustrating a concept 11 of performing injection molding using the organic-inorganic kneaded composition 30 and the metal injection molding unit according to the present invention.

Figure 11:
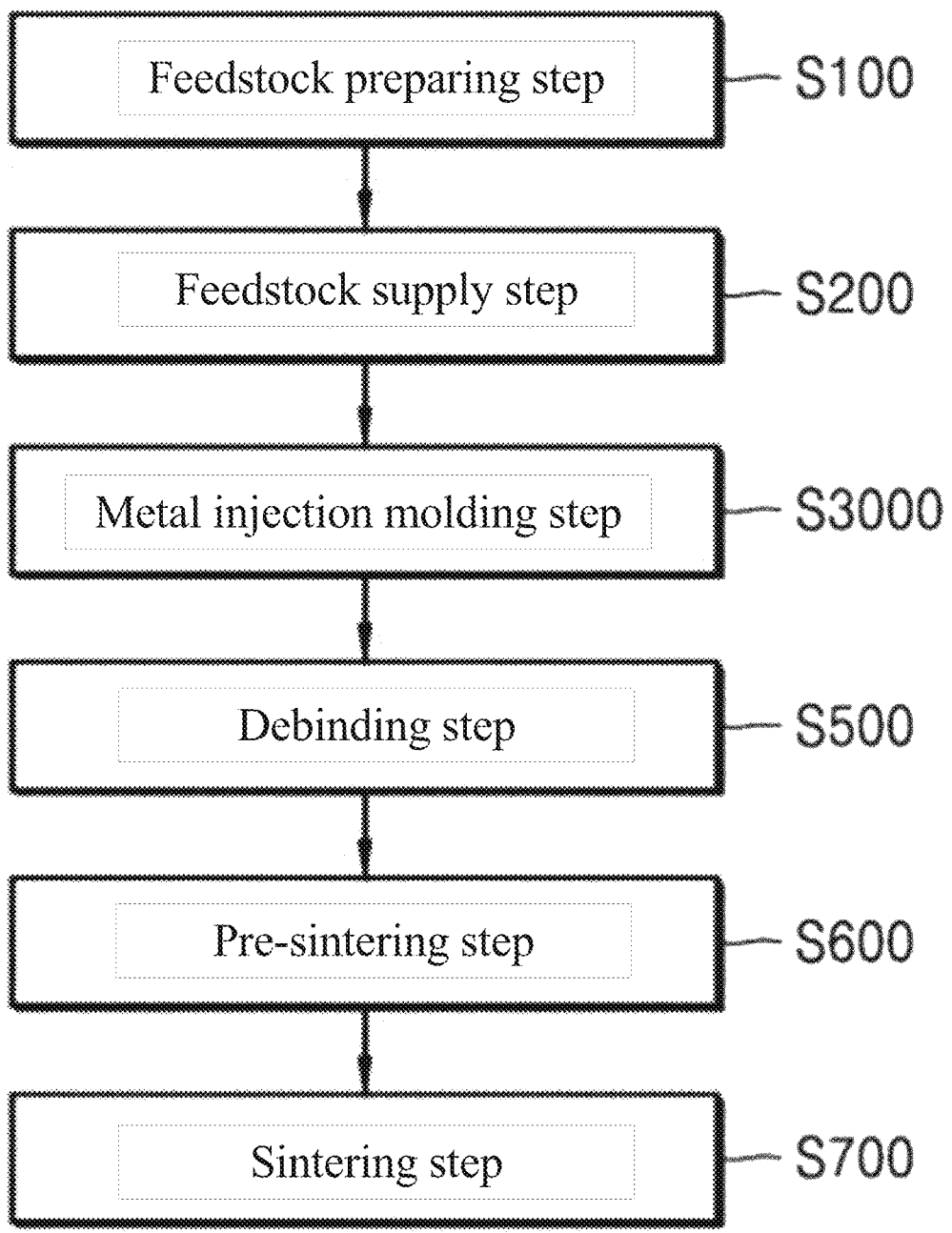
FIG. 11 is a flowchart illustrating a metal injection molding method using an organic-inorganic kneaded composition as a feedstock according to the present invention.

In addition, FIG. 11 shows a method of manufacturing an ODS alloy using metal injection molding.

Referring to FIGS. 10 and 11, the ODS alloy manufacturing method by the metal injection molding is only different in the method of molding, compared to the manufacturing method using the 3D printing method described above and the steps of preparing feedstocks and processing steps after the molding step are substantially the same. Therefore, in the following, descriptions of overlapping parts will be omitted and only parts with differences will be described.

In this modified embodiment, the organic-inorganic kneaded composition is prepared in the same manner as in the above-described embodiment and then supplied to the metal injection molding unit 1000 through a feedstock supply unit (not shown). The supplied feedstock is injection molded (S3000) by a metal injection molding unit and then goes through the debinding step. Subsequent steps are substantially the same as in the above-described embodiment.

Hereinafter, preferred embodiments of the present invention will be described in detail with reference to the accompanying drawings in order to enable those skilled in the art to easily implement the present invention.

First Embodiment

As a first embodiment, an ODS alloy was prepared using a 3D printing method using an organic-inorganic kneaded composition.

First, iron, chromium, molybdenum, titanium, zirconium, and yttria powders were prepared using a ball-mill process to prepare ODS mixed powders.

Specifically, iron, chromium, molybdenum, titanium, zirconium, and yttria in powder form were mixed in the initial stage. In the mixed powder, chromium, molybdenum, titanium, zirconium, and yttria were 14% by weight, 1.0% by weight, 0.1% by weight, 0.25% by weight, and 0.35% by weight, respectively, and the balance was iron powder.

Figure 5:
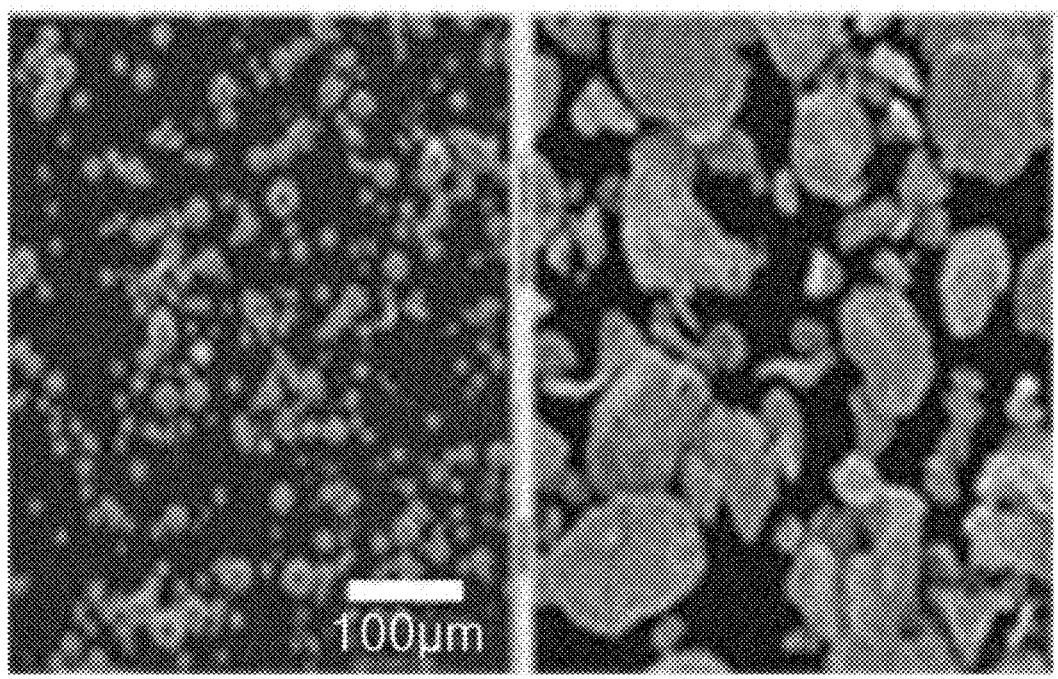
FIG. 5 is an optical microscope (OM) image of the ODS mixed powders according to an embodiment of the present invention.

In the next step, 55 g of the mixed powder and zirconia beads were put into the chamber, and ball-milled at 300 rpm for 48 hours, and a final ODS mixed powders was obtained. FIG. 5 is an optical microscope image of ODS mixed powders.

The obtained ODS mixed powders was separated by particle sizes using a mesh. The size of the mesh was 325, and the mixed powders were put into the mesh and the ODS mixed powders passed were used to prepare the organic-inorganic kneaded composition.

After kneading the ODS powder and the polyethylene copolymer as a binder, paraffin wax, and stearic acid uniformly at 170° C. for 1 hour, the kneaded composition was cooled to room temperature. The kneaded and cooled composition was pulverized to match the particle size uniformly, and then granulated into pellets to prepare an organic-inorganic kneaded composition. 3D printing was performed using the pellets. The 3D-printed specimen was transferred to a solvent debinding unit to perform debinding treatment in a tetrahydrofuran solvent. The solvent-debinded specimen was heated stepwise to 500° C. in a nitrogen atmosphere and hot debinded to remove all organic components remaining in the specimen.

Next, general sintering was performed using the debinded specimen. At this time, in order to observe the difference in mechanical properties depending on the sintering temperature at which general sintering is performed, the temperature of general sintering was divided into 1150° C., 1250° C. and 1300° C. Specimens sintered at 1150° C., 1250° C. and 1300° C. are designated as Specimen 1, Specimen 2 and Specimen 3, respectively.

After the general sintering was completed, specimens 1 to 3 were subjected to hot isostatic pressure sintering at 1150° C. for 4 hours in an Ar atmosphere under a pressure of 1000 bar to prepare a final specimen.

Figure 6:
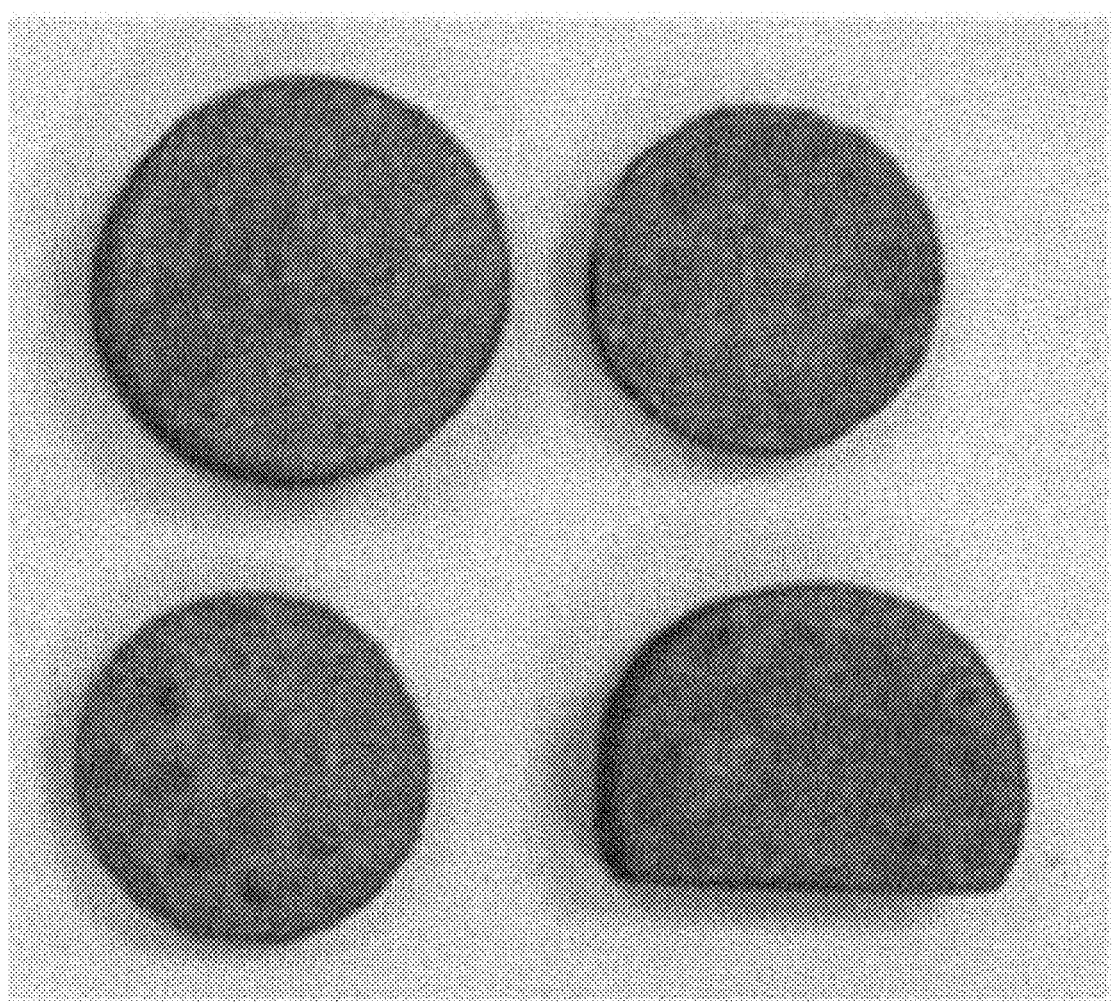
FIG. 6 is an image of a final product manufactured through 3D printing according to the present invention.

FIG. 6 is an image observed with an optical microscope of specimen 1, which has been subjected to hot isostatic pressure sintering. Referring to FIG. 6, it can be seen that an ODS alloy can be manufactured by three-dimensional printing using organic-inorganic kneaded composition including ODS mixed powders.

Table 1 shows the Vickers hardness values after the general sintering and hot isostatic pressure sintering of specimens 1 to 3 are completed. Vickers hardness was measured for 15 seconds under a load condition of 4.9N.

TABLE 1

| Specimen | After general sintering of specimen (Hv) | after hot isostatic pressure sintering (Hv) |
| --- | --- | --- |
| Specimen 1 | 10.6 | 32 |
| Specimen 2 | 27 | 38.3 |
| Specimen 3 | 110 | 360 |

Referring to Table 1, in the case of specimen 1 and specimen 2 having a general sintering temperature of 1150° C. and 1200° C., both the Vickers hardness after general sintering showed a low value of less than 30 Hv, and even after hot isostatic pressure sintering was performed, it showed a low hardness value. On the other hand, in the case of specimen 3, where the temperature of general sintering was 1300° C., the Vickers hardness after general sintering was 110 Hv, which was significantly improved compared to the specimens 1 and 2, and after hot isostatic pressure sintering, the hardness value was 360 Hv. This corresponds to a value approximately equal to the hardness value of an ODS alloy manufactured by sintering mechanically alloyed powders using a conventional ball mill or the like.

As described above, in the case of manufacturing an ODS alloy by a 3D printing method using an organic-inorganic kneaded composition according to the technical idea of the present invention, the mechanical properties of the ODS alloy can be remarkably improved by optimizing the temperature of general sintering.

That is, according to the technical idea of the present invention, the mechanical strength of the ODS alloy can be improved since general sintering performed before the final hot hydrostatic sintering is performed at a temperature higher than 1250° C., for example, in the range of more than 1250° C. and 1300° C. in a 3D printing method using an organic-inorganic blended composition.

It is estimated that the reason for this effect is that the high-temperature treatment in the general sintering step can effectively remove residual organic matter that has not been completely removed in the debinding step. That is, in the case of 3D printing using the organic-inorganic kneaded composition, even if the step of debinding the 3D-printed specimen is completed, some organic substances included in the feedstock may remain fine. Such fine residual organic matter is an impurity that interferes with atomic diffusion and may act as an element that prevents densification through bonding between powders in the hot isostatic pressure sintering step. Densification of the microstructure may not be achieved unexpectedly due to fine impurities that interfere with the bonding of the powder in the hot isostatic pressure sintering step, which means deterioration of mechanical properties.

Therefore, bonding between powders by diffusion of atoms can be made more smoothly by applying sufficient thermal energy in the general sintering step corresponding to the pretreatment before hot isostatic pressure sintering to remove the fine remaining organic matter not completely removed in the debinding step by evaporation by heat.

In this case, the general sintering step may be performed at a higher temperature than the hot isostatic pressure sintering step. For example, as described above, the general sintering step may be performed in a range of more than 1250° C. to 1325° C., and the hot isostatic pressure sintering step may be performed at 1100° C. to 1200° C. If the sintering temperature in the hot isostatic pressure sintering step is too high, there may be a problem in that mechanical properties are deteriorated due to coarsening of a structure due to grain growth. Accordingly, after sufficiently removing residual impurities in the general sintering step, the sintering is performed by lowering the temperature to obtain optimum mechanical properties. Through this, after the hot isostatic pressure sintering step is completed, it is possible to manufacture an ODS alloy that is denser and exhibits excellent mechanical strength while having a microstructure with less defects inside.

Second Embodiment

As a second embodiment, an ODS alloy was produced using a metal injection molding (MIM) method using an organic-inorganic kneaded composition. In the case of the second embodiment, the molding of the ODS alloy was carried out in substantially the same manner as in the first embodiment, except that the molding of the ODS alloy was performed using a metal injection molding unit. In this second example, the general sintering temperature was divided at 1150° C., 1250° C. and 1300° C. like the first embodiment. Specimens sintered at 1150° C., 1250° C. and 1300° C. are designated as Specimen 4, Specimen 5 and Specimen 6, respectively.

Figure 7:
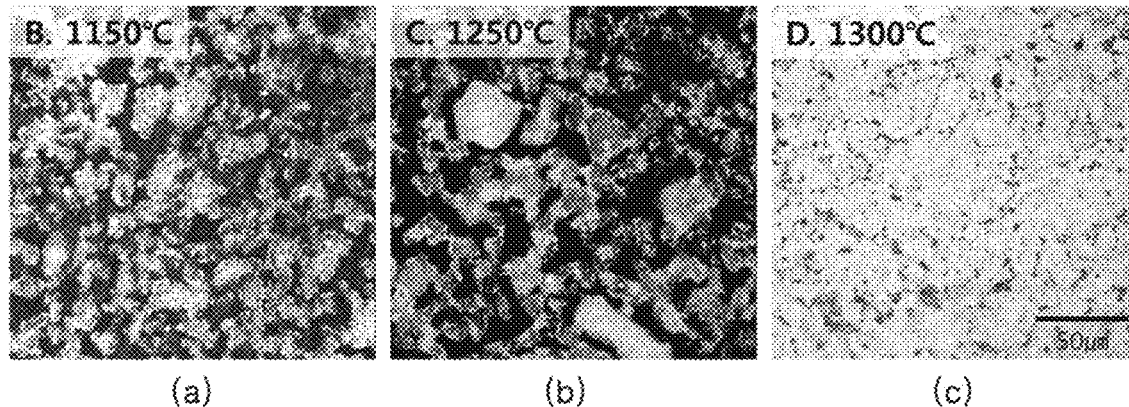
FIG. 7 is a result of observing the microstructure of the specimen according to the sintering temperature in a general sintering step with an optical microscope.

FIGS. 7A to 7C show the results of observing the microstructures of Specimens 4 to 6 on which general sintering was completed with an optical microscope. Referring to FIGS. 7A and 7B, it can be seen that in the case of specimens 4 and 5 sintered at 1150° C. and 1250° C., the bonding among the powders is not dense, and there are significant voids between the powders. have. On the other hand, as shown in 7C, in the case of the specimen 6 sintered at 1300° C., the bonding among the powders is dense, so that the voids among the powders are hardly observed.

Figure 8:
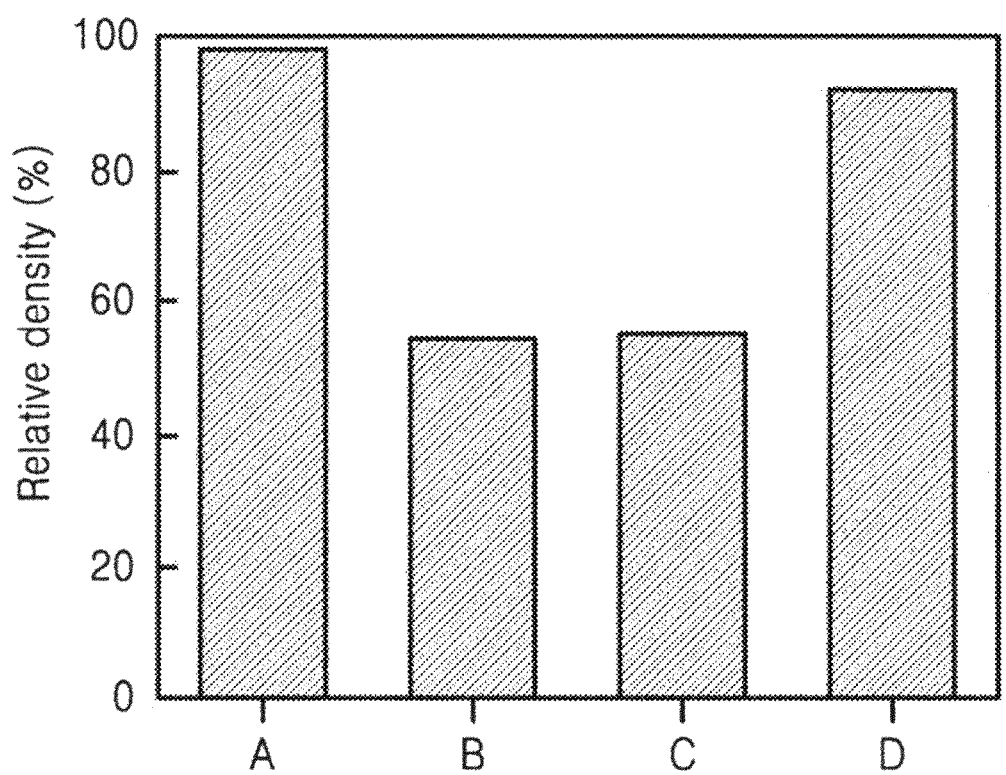
FIG. 8 is a result of measuring the relative density of a specimen according to the sintering temperature in a general sintering step.

FIG. 8 shows the results of measuring the relative densities of specimens 4 to 6 on which hot isostatic pressure was completed. B, C, and D in FIG. 8 represent Specimen 4, Specimen 5, and Specimen 6. Meanwhile, A in FIG. 8 is a comparative example, which is a measurement value of the relative density of a specimen subjected to hot isostatic pressure sintering after mechanically alloying the same ODS alloy using a ball mill. The specimen of the comparative example is referred to as specimen 7.

Referring to FIG. 8, it can be seen that Specimen 4 and Specimen 5 (B and C of FIG. 8) have a relative density of less than about 60% compared to the comparative example specimen (A of FIG. 8) manufactured by the conventional method. In contrast, specimen 6 (D in FIG. 8), it can be seen that the relative density value is approximately equivalent to that of the comparative example specimen 7, which is 95%.

Figure 9:
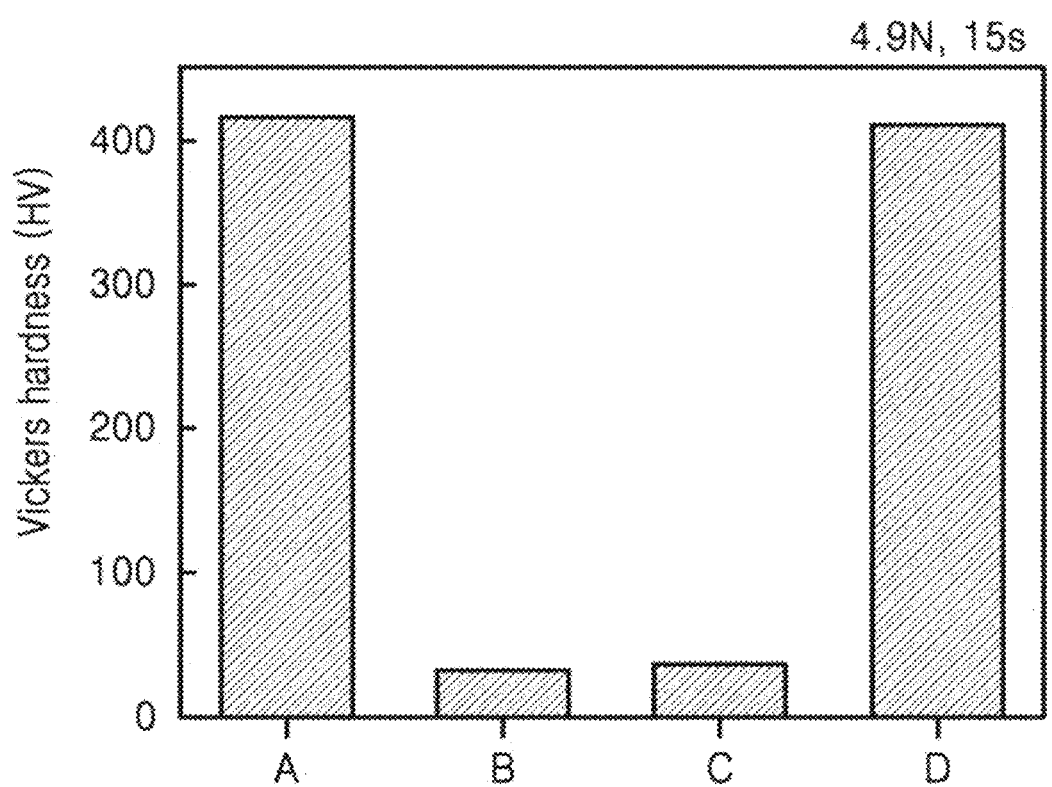
FIG. 9 is a result of measuring the Vickers hardness of a specimen according to the sintering temperature in a general sintering step.

FIG. 9 shows the measured values of Vickers hardness of specimens 4 to 6 in which hot isostatic pressure was completed. As expected, specimens 4 and 5 (B and C of FIG. 9) showing low relative density values due to inadequate microstructure showed low Vickers hardness values of less than 100 Hv, but specimens with dense microstructure and high relative density 6 (D in FIG. 10) showed a high hardness value exceeding 400 Hv. It can be seen that this is a high hardness value substantially equivalent to that of the comparative example (A of FIG. 9).

It can be seen that the second embodiment, in which the ODS alloy was manufactured by injection molding of metal powder using the organic-inorganic kneading composition, can also exhibit mechanical properties equivalent to that of the ODS alloy manufactured by the conventional method. This cause has been described in the first embodiment, and thus will be omitted here.

In summary, according to the technical idea of the present invention, in the case of an ODS alloy manufactured by hot isostatic pressure sintering after molding through 3D printing or metal injection molding using an organic-inorganic kneaded composition as a feedstock, characteristics equivalent to those of the ODS alloy manufactured by the conventional mechanically alloying method can be realized by performing the general sintering step at a high sintering temperature capable of sufficiently inputting heat energy in the general sintering step. This means that the ODS alloy manufacturing method according to the technical idea of the present invention can manufacture the ODS alloy using a much more economical and inexpensive process compared to the conventional method.

Although the present invention has been shown and described with reference to a preferred embodiment as described above, it is not limited to the above embodiment, and within the scope not departing from the spirit of the present invention, various It can be transformed and changed. Such modifications and variations should be viewed as falling within the scope of the present invention and the appended claims.

What is claimed is:

1. A method for producing an oxide-dispersed strengthened alloy using organic-inorganic kneaded composition, the method comprising:
   a feedstock preparing step of preparing the organic-inorganic kneaded composition prepared by kneading, pulverizing and granulating oxide-dispersion strengthening (ODS) mixed powders and a polymeric binder;
   a molding step of forming a semi-finished product having a predetermined shape using the organic-inorganic kneaded composition, the molding step being performed using a metal injection molding unit and including:
      a feedstock supply step of supplying the organic-inorganic kneaded composition to the metal injection molding unit; and
      a semi-finished product molding step of injection-forming the semi-finished product using the metal injection molding unit;

a debinding step of removing the polymeric binder from the semi-finished product molded in the molding step; and a sintering step of extracting a final product having a predetermined shape by sintering and cooling the semi-finished product in which the polymeric binder has been removed in the debinding step, wherein the ODS mixed powders are prepared by mixing metal powders and metal oxides, wherein the sintering step includes:
a general sintering step of performing sintering at a sintering temperature after raising the sintering temperature to a temperature range of 1250° C. to 1325° C. or less in a vacuum atmosphere; and
a hot isostatic pressure sintering step of performing sintering in a sintering temperature lower than the sintering temperature of the general sintering step in an isostatic pressure atmosphere, and wherein the ODS mixed powders include the metal oxides which are one or more of yttria ($Y_2O_3$), thorium oxide ($ThO_2$), lanthanum oxide ($La_2O_3$), and scandium oxide ($Sc_2O_3$).

2. The method of claim 1, wherein the sintering temperature of the hot isostatic pressure sintering step has a temperature range of 1100° C. to 1200° C.

3. The method of claim 1, wherein the hot isostatic pressure sintering step is performed for 1 to 5 hours in an argon (Ar) atmosphere of 1000 to 1200 bar.

4. The method of claim 1, further includes, prior to the sintering step, a pre-sintering step of heating the semi-finished product from which the polymeric binder has been removed in the debinding step, wherein the semi-finished product is heated in a vacuum atmosphere in a range of 700° C. to 900° C. in the pre-sintering step.

5. The method of claim 1, wherein the metal powders include at least one of nickel, iron, chromium, manganese, molybdenum, aluminum, titanium, and zirconium.

6. The method of claim 1, wherein in the feedstock preparing step, the organic-inorganic kneaded composition is prepared by kneading, pulverizing and granulating 90.0 to 94.0 wt % of the ODS mixed powders, 3.0 to 5.0 wt % of the binder, 2.5 to 3.5 wt % of plasticizer, and 0.5 to 1.5 wt % of lubricant.

7. The method of claim 6, wherein the binder includes a polyethylene copolymer.

8. The method of claim 6, wherein the plasticizer includes paraffin wax.

9. The method of claim 6, wherein the lubricant includes stearic acid.

10. The method of claim 6, wherein the debinding step includes:
a solvent debinding step of removing the plasticizer and the lubricant from the polymeric binder by immersing the semi-finished product in a solvent; and
a hot debinding step of removing the binder from the polymeric binder by heating the semi-finished product in the solvent debinding step.

11. The method of claim 10, wherein the solvent debinding step includes immersing the semi-finished product in a tetrahydrofuran or heptane solvent at 25 to 35° C. for 24 hours or more to remove the plasticizer and the lubricant.

12. The method of claim 10, wherein the hot debinding step includes removing the binder by heating the semi-finished product while raising a temperature in a range of 450° C. to 500° C. in a nitrogen (N2) atmosphere.

13. The method of claim 1, wherein the metal injection molding unit includes a screw.

14. A method for producing an oxide-dispersed strengthened alloy using organic-inorganic kneaded composition, the method comprising:
a feedstock preparing step of preparing the organic-inorganic kneaded composition prepared by kneading, pulverizing and granulating oxide-dispersion strengthening (ODS) mixed powders and a polymer binder;
a molding step of forming a semi-finished product having a predetermined shape using the organic-inorganic kneaded composition, the molding step being performed using a 3D printer and including:
a feedstock supply step of supplying the organic-inorganic kneaded composition to an extrusion head of the 3D printer;
a lamination step of laminating a printed layer on a plate by discharging the molten organic-inorganic kneaded composition to a surface of the plate through a nozzle of the extrusion head; and
a semi-finished product forming step of forming the semi-finished product by continuously laminating the printed layer in a three-dimensional shape of an object to be printed by repeatedly performing the lamination step,
a debinding step of removing the polymeric binder from the semi-finished product molded in the molding step; and
a sintering step of extracting a final product having a predetermined shape by sintering and cooling the semi-finished product in which the polymeric binder has been removed in the debinding step,
wherein the ODS mixed powders are prepared by mixing metal powders and metal oxides,
wherein the sintering step includes:
a general sintering step of performing sintering at a sintering temperature after raising the sintering temperature to a temperature range of 1250° C. to 1325° C. or less in a vacuum atmosphere; and
a hot isostatic pressure sintering step of performing sintering in a sintering temperature lower than the sintering temperature of the general sintering step in an isostatic pressure atmosphere, and
wherein the ODS mixed powders include the metal oxides which are one or more of yttria ($Y_2O_3$), thorium oxide ($ThO_2$), lanthanum oxide ($La_2O_3$), and scandium oxide ($Sc_2O_3$).

15. The method of claim 14, wherein the sintering temperature of the hot isostatic pressure sintering step has a temperature range of 1100° C. to 1200° C.

16. The method of claim 14, wherein the hot isostatic pressure sintering step is performed for 1 to 5 hours in an argon (Ar) atmosphere of 1000 to 1200 bar.

17. The method of claim 14, further includes, prior to the sintering step, a pre-sintering step of heating the semi-finished product from which the polymeric binder has been removed in the debinding step, wherein the semi-finished product is heated in a vacuum atmosphere in a range of 700° C. to 900° C. in the pre-sintering step.

18. The method of claim 14, wherein the metal powders include at least one of nickel, iron, chromium, manganese, molybdenum, aluminum, titanium, and zirconium.

19. The method of claim 14, wherein in the feedstock preparing step, the organic-inorganic kneaded composition is prepared by kneading, pulverizing and granulating 90.0 to 94.0 wt % of the ODS mixed powders, 3.0 to 5.0 wt % of the binder, 2.5 to 3.5 wt % of plasticizer, and 0.5 to 1.5 wt % of lubricant.

* * * * *